N. C. ODDO.
AUTOMOBILE HORN.
APPLICATION FILED SEPT. 20, 1912.

1,066,037.

Patented July 1, 1913.

WITNESSES
S. E. Wade
R. W. Smith

INVENTOR
Nicoll C. Oddo
BY Munn & Co.
ATTORNEYS

UNITED STATES PATENT OFFICE.

NICOLL C. ODDO, OF MIDDLETOWN, NEW YORK.

AUTOMOBILE-HORN.

1,066,037.

Specification of Letters Patent.

Patented July 1, 1913.

Application filed September 20, 1912. Serial No. 721,379.

*To all whom it may concern:*

Be it known that I, NICOLL C. ODDO, a citizen of the United States, and a resident of Middletown, in the county of Orange and State of New York, have invented certain new and useful Improvements in Automobile-Horns, of which the following is a specification.

My invention is an improvement in an automobile horn, and has for its object the provision of a simple, inexpensive device of the character specified, for producing a warning sound, capable of attachment to any automobile, and in any desired position, and which may be operated from a distance or at hand, as may be desired.

Figure 1:
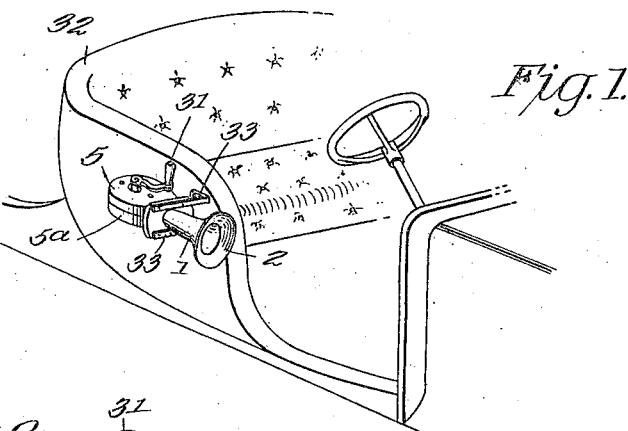
Figure 2:
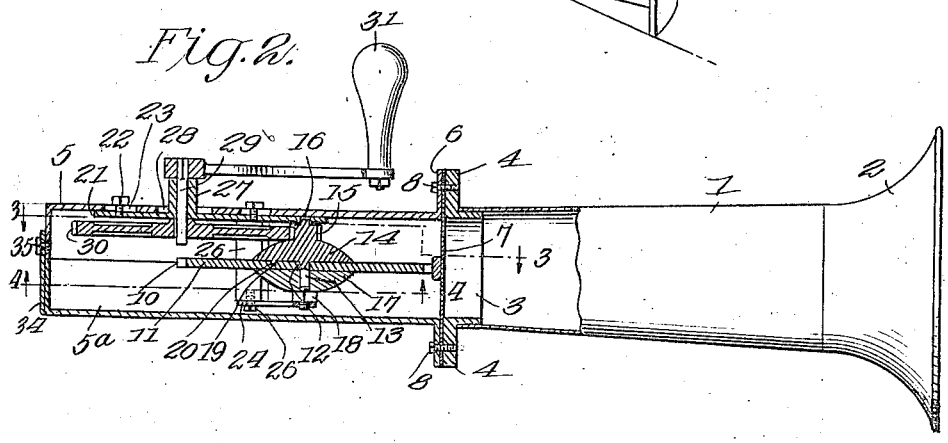
Figures 3, 4:
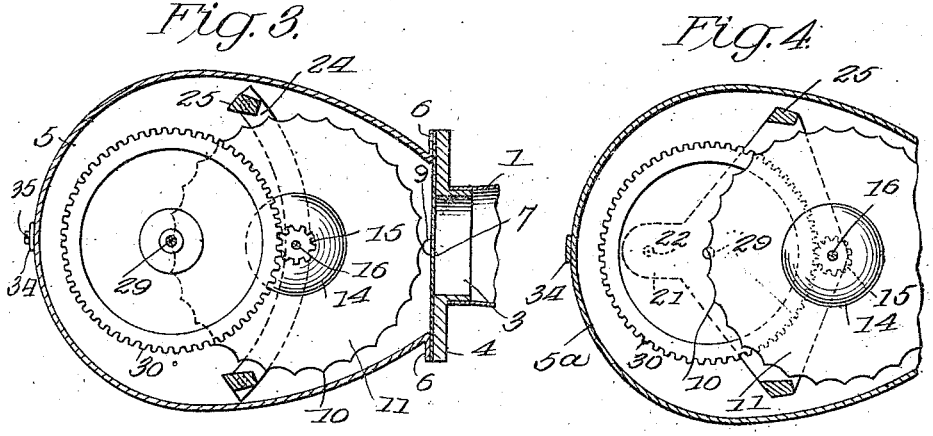

In the drawings:—Figure 1 is a perspective view of the improved horn in position on an automobile, Fig. 2 is a partial longitudinal vertical section, and Figs. 3 and 4 are sections on the lines 3—3 and 4—4 respectively of Fig. 2.

The present embodiment of the invention comprises a horn of any suitable construction, preferably having a body 1 and a bell 2, the body being tapering as shown, and fitting at its small end on to a laterally extending nipple 3 on a plate 4. The operating mechanism for the horn is contained within a casing, consisting of sections 5, 5ª, each of which is approximately cup-shaped and of oval form. One end of each of the said sections is rounded and the other end is open and provided with a laterally extending flange 6.

A diaphragm 7 of suitable flexible material, and capable of being vibrated, is held between the plate 4 and the flanges 6 by means of screws 8, the said screws passing through the flanges 6 and engaging the plate 4. A lug or projection 9 is secured to the center of the diaphragm, and the lug is adapted to be engaged by the teeth 10 on a disk or wheel 11, mounted to rotate at approximately the center of the casing 5, 5ª. The said disk is provided with a central opening 12, and the opening is engaged by a central threaded stem or lug 13, on a hub section 14. The said hub section is provided with an annular series of teeth, forming a pinion 15, and on the opposite face of the hub section from the stem with a spindle 16 in alinement with the stem.

The opposite hub section 17 is provided with a central opening through which the stem extends and the stem is engaged by a nut 18, to hold the hub section clamped on the disk or wheel. The disk is provided on the face adjacent to the hub section 14 with a depression 19 and the hub section is provided with a lug 20 engaging the depression to prevent rotation of the disk with respect to the hub.

It will be noticed that the teeth 10 of the disk 11 are formed by arc-shaped cuts in the periphery of the disk, the said cuts having their arch inwardly and the teeth being formed at the junction of the cuts with each other.

The spindle 16 of the hub section 14 engages an opening in a plate 21, which is secured to the casing section 5 by means of screws 22, the said screws passing through slots 23 in the casing section and engaging openings in the plate. The extremity of the stem 13 engages an opening at the center of an arc-shaped bar 24, whose ends are secured to the lower ends of standards or posts 25 by means of screws 26.

The standards or posts 25 are near the sides of the casing 5, 5ª, and depend from the plate 21, before mentioned. The plate 21 before mentioned is provided at its center with a hub or arbor 27, which passes through a slot or opening 28, in the section 5 of the casing. A shaft 29 is journaled in the hub or arbor and a gear wheel 30 is secured to the lower end of the shaft. The gear wheel engages the pinion 15 and the shaft is rotated by means of a crank 31, secured to the outer end thereof.

It will be evident that when the gear wheel 30 is rotated by means of the crank, the disk or wheel 11 will be rotated, to cause the teeth 10 thereof to engage in rapid sequence the lug 9 on the diaphragm, thus causing the said diaphragm to vibrate rapidly. The waves of air set in motion by this rapid vibration of the diaphragm will pass out through the horn, which will intensify and direct said vibration forwardly. As long as the disk 11 is rotated, a continuous volume of sound waves will be projected forwardly.

The horn may be arranged in any desired position, as for instance, adjacent to the seat 32 of the automobile, with the handle 31 upwardly and the device may be held in place by means of angle plates or bars 33, each having one of its portions secured to the automobile and the other to the plate 4 before mentioned.

It is obvious that were the device arranged out of reach of the operator, a flexible shaft might be connected with the shaft 29.

It is also obvious that without departing from the spirit of the invention, the device might be arranged to be operated by power, either from the engine or any other desired moving part.

It will be understood that the device may be of any desired size and shape, depending upon the object to be served.

The casing sections are held together by means of the screws 8, and by means of a plate 34, which is secured to the section 5 by means of a screw 35, and laps over the section 5ª as shown more particularly in Fig. 2.

The provision of the slots 28 permits the frame comprising the plate 21 and the standards 25 to be adjusted toward and from the diaphragm, whereby to vary the amplitude of the vibrations of the diaphragm. By loosening the screws 22, the said frame may be moved toward or from the diaphragm, and held in this position by tightening the said screws.

I claim:—

1. A device of the character specified, comprising a casing having at one end an opening and having a laterally extending flange at the opening, a plate provided with a central nipple registering with the opening, an intensifying horn having one end engaged with the nipple, a diaphragm arranged between the plate and the flange across the opening of the nipple, said diaphragm having a transversely rounded lug on its inner face, a disk mounted to rotate in the casing, said disk having teeth for engaging the lug to vibrate the diaphragm when the disk is rotated, means for rotating the disk, said means comprising a pinion co-axial with the disk, a gear wheel journaled in the casing and engaging the pinion, and a crank connected to the gear wheel for turning the same.

2. A device of the character specified, comprising a sectional casing having one end open, each of the sections being flanged laterally at the said opening, a plate having a central nipple connected to the flanges, a diaphragm having a lug on its inner face held between the plate and the flanges, a frame supported in the casing, said frame being adjustable toward and from the diaphragm, the casing having enlarged openings and screws passing through the openings and engaging the frame, said screws clamping the frame to the casing, a toothed wheel journaled in the frame for engaging the lug of the diaphragm, and means supported by the frame for operating the wheel.

NICOLL C. ODDO.

Witnesses:
T. H. BINGHAM,
H. WINTERBORMER.